United States Patent
Beck et al.

(10) Patent No.: US 7,344,645 B2
(45) Date of Patent: *Mar. 18, 2008

(54) METHODS OF MINIMISING THE EFFECT OF INTEGRITY LOSS IN HOLLOW FIBRE MEMBRANE MODULES

(75) Inventors: Thomas William Beck, North Richmond (AU); Warren Thomas Johnson, Grose Vale (AU)

(73) Assignee: Siemens Water Technologies Corp., Warrendale, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/496,378

(22) Filed: Jul. 31, 2006

(65) Prior Publication Data

US 2006/0266706 A1 Nov. 30, 2006

Related U.S. Application Data

(63) Continuation of application No. 11/015,655, filed on Dec. 16, 2004, now Pat. No. 7,160,463, which is a continuation of application No. PCT/AU03/00755, filed on Jun. 17, 2003.

(30) Foreign Application Priority Data

Jun. 18, 2002 (AU) .................................... PS3006

(51) Int. Cl.
  *B01D 61/00* (2006.01)
  *B01D 63/00* (2006.01)
  *B01D 53/22* (2006.01)
  *B29C 65/00* (2006.01)
(52) U.S. Cl. .............. 210/650; 210/321.78; 210/321.8; 210/321.88; 210/500.23; 96/4; 96/10

(58) Field of Classification Search ........... 210/500.23, 210/321.79, 321.78, 321.8, 321.81, 321.87, 210/321.88, 321.89, 321.9, 650; 96/4, 10; 156/295; 264/41
See application file for complete search history.

(56) References Cited

U.S. PATENT DOCUMENTS 4,369,605 A * 1/1983 Opersteny et al. ............ 451/38
4,647,377 A   3/1987 Miura (Continued)

FOREIGN PATENT DOCUMENTS

EP    627255 A * 12/1994

(Continued)

OTHER PUBLICATIONS

Johnson, "Recent Advances in Microfiltration for Drinking Water Treatment," AWWA Annual Conference, Jun. 20-24, 1999, Chicago, Illinois, entire publication.

(Continued)

*Primary Examiner*—Ana Fortuna

(57) ABSTRACT

A method and apparatus for reducing the effect of integrity loss in a hollow fiber membrane module, said module including a plurality of hollow fiber membranes (5), at least one end of the fiber membranes (5) being supported in a pot (6), the method including the step of increasing flow resistance of the liquid through the lumen (8) of the fiber membrane (5) in the region of the pot (6).

1 Claim, 3 Drawing Sheets

U.S. PATENT DOCUMENTS

| | | | |
|---|---|---|---|
| 4,876,006 A | | 10/1989 | Ohkubo et al. |
| 4,933,084 A | * | 6/1990 | Bandel et al. ......... 210/500.23 |
| 5,192,456 A | | 3/1993 | Ishida et al. |
| 5,209,852 A | | 5/1993 | Sunaoka et al. |
| 5,248,424 A | | 9/1993 | Cote et al. |
| 5,480,553 A | | 1/1996 | Yamamori et al. |
| 5,552,047 A | * | 9/1996 | Oshida et al. ........... 210/321.8 |
| 5,575,963 A | | 11/1996 | Soffer et al. |
| 5,607,593 A | | 3/1997 | Cote et al. |
| 5,639,373 A | | 6/1997 | Mahendran et al. |
| 5,643,455 A | | 7/1997 | Kopp et al. |
| 5,783,083 A | | 7/1998 | Henshaw et al. |
| 5,843,069 A | * | 12/1998 | Butler et al. ............. 604/891.1 |
| 5,944,997 A | | 8/1999 | Pedersen et al. |
| 5,958,243 A | | 9/1999 | Lawrence et al. |
| 6,036,030 A | * | 3/2000 | Stone et al. ................ 210/490 |
| 6,045,698 A | | 4/2000 | Cote et al. |
| 6,156,200 A | | 12/2000 | Zha et al. |
| 6,193,890 B1 | | 2/2001 | Pedersen et al. |
| 6,214,231 B1 | | 4/2001 | Cote et al. |
| 6,284,135 B1 | | 9/2001 | Ookata |
| 6,325,928 B1 | | 12/2001 | Pedersen et al. |
| 6,375,848 B1 | | 4/2002 | Cote et al. |
| 6,780,466 B2 | * | 8/2004 | Grangeon et al. .......... 427/256 |
| 6,893,568 B1 | | 5/2005 | Janson et al. |

FOREIGN PATENT DOCUMENTS

| | | |
|---|---|---|
| EP | 1 034 835 | 9/2000 |
| JP | 60206412 | 10/1985 |
| JP | S63-38884 | 7/1986 |
| JP | 62-250908 | 10/1987 |
| JP | 63-143905 | 6/1988 |
| JP | 04-250898 | 9/1992 |
| JP | 04-265128 | 9/1992 |
| JP | 05-096136 | 4/1993 |
| JP | 05-285348 | 11/1993 |
| JP | 06-218237 | 8/1994 |
| JP | 06-285496 | 10/1994 |
| JP | 06-343837 | 12/1994 |
| JP | 07-024272 | 1/1995 |
| JP | 07-155758 | 6/1995 |
| JP | 07-185268 | 7/1995 |
| JP | 07-185271 | 7/1995 |
| JP | 09-220569 | 8/1997 |
| JP | 11-165200 | 6/1999 |
| WO | WO 93/02779 | 2/1993 |
| WO | WO 93/15827 | 8/1993 |
| WO | WO 98/28066 | 7/1998 |
| WO | WO 0240140 A * | 5/2002 |

OTHER PUBLICATIONS

Kaiya et al., "Water Purification Using Hollow Fiber Microfiltration Membranes," 6th World Filtration Congress, Nagoya, 1993, pp. 813-816.

Lozier et al., "Demonstration Testing of ZenonGem and Reverse Osmosis for Indirect Potable Reuse Final Technical Report," published CH2M Hill, available from the National Technical Information Service, Operations Division, Jan. 2000, entire publication.

Ueda et al., "Effects of Aeration on Suction Pressure in a Submerged Membrane Bioreactor," *Wat. Res.* vol. 31, No. 3, 1997, pp. 489-494.

Zenon, "Proposal for ZeeWeed® Membrane Filtration Equipment System for the City of Westminster, Colorado, Proposal No. 479-99," Mar. 2000, entire publication.

Supplemental EP Search Report (EP03759787) dated May 27, 2005.

PCT International Search Report for PCT/AU03/00755 mailed Sep. 3, 2003.

* cited by examiner $TMP = P_1 - P_2$

METHODS OF MINIMISING THE EFFECT OF INTEGRITY LOSS IN HOLLOW FIBRE MEMBRANE MODULES

RELATED APPLICATIONS

This application is a continuation of U.S. patent application Ser. No. 11/015,655, filed Dec. 16, 2004, entitled METHODS OF MINIMISING THE EFFECT OF INTEGRITY LOSS IN HOLLOW FIBRE MEMBRANE MODULES, which is a continuation of International Patent Application No. PCT/AU03/007755, filed on Jun. 17, 2003, under the Patent Cooperation Treaty (PCT), which was published by the International Bureau in English on Dec. 24, 2003, which designates the United States and which claims the benefit of Australian Provisional Patent Application No. PS 3006, filed Jun. 18, 2002.

FIELD OF THE INVENTION

The present invention relates to membrane filtration systems and in particular to system using a plurality of porous hollow fibre membranes wherein loss of membrane integrity can lead to degradation of filtration performance.

BACKGROUND OF THE INVENTION

Consider a typical hollow fibre membrane module as shown in FIG. 1. The module consists of plurality of hollow fibre membranes 5 potted at least at one end into a pot 6 having a length L. In order to calculate the flow from individual fibres the TMP (Transmembrane pressure $P_1$-$P_2$) is considered as acting across a total module resistance R to give a flow Q:

TMP/R $\alpha$Q (at constant temperature)

Now in this typical model we can break the resistance down into:

$R=R_m+R_{pot}$ and $Q_i \alpha TMP/(R_m+R_{pot})$ where $Q_i$ is the flow emerging from the top of the intact fibre, $R_m$ is the module resistance and $R_{pot}$ is the resistance across the pot.

We can assume $R_m$ is constant—a sort of average—though it will vary down the length of the fibre.

Now taking the case where a fibre is broken at the top pot (a worst case for filtrate bypass). In this case:

$R_m=0$ and $Q_b \alpha TMP/R_{pot}$ where $Q_b$ is the flow of filtrate emerging from the top of the broken fibre.

The ratio of the flow down a broken fibre to the flow down an intact fibre is calculated as follows:

$$= Q_b / Q_i = (R_m + R_{pot}) / R_{pot}$$

$$= 1 + R_m / R_{pot}$$

In the normal case $R_m >> R_{pot}$—typically 20. Thus it can be seen a broken fibre allows a significant amount of feed to contaminate the filtrate and thus degrade filtration performance. Additionally, increasing the internal diameter of the fibre makes the problem massively worse as typically $R_{pot} \alpha L/d^4$, where d is the diameter of the lumen and L is the length of the pot.

Accordingly, it is desirable to reduce the flow of filtrate from a broken fibre. Take the case where we increase $R_{pot}$ (for instance by increasing L or reducing d). The limit of $Q_b/Q_i$ tends to 1. This is a highly desirable result. But increasing the length of the pot is undesirable in other ways—it increases the length of the module and the expense of the module and process. The other option is to reducing the internal diameter of the fibre in the pot.

SUMMARY OF THE INVENTION

It is an object of the present invention to overcome or at least ameliorate the problems of the prior art associated with integrity loss in hollow fibre membrane filtration systems or at least provide a useful alternative.

According to one aspect, the present invention provides a method of reducing the effect of integrity loss in a hollow fibre membrane module, said module including a plurality of hollow fibre membranes, at least one end of said fibre membranes being supported in a pot, the method including the step of increasing flow resistance of the liquid through the lumen of the fibre membrane in the region of the pot.

Preferably, the step of increasing the flow resistance is produced by reducing the inner cross-sectional area of the fibre lumen in the region of the pot. For preference, the step of increasing the flow resistance is produced by placing a porous layer in the flow path of the fibre lumen in the region of the pot.

According to a second aspect, the present invention provides a hollow fibre membrane module including a plurality of hollow fibre membranes supported at least at one end in a pot and having flow restriction means in the lumens of said fibre membranes in the region of said pot.

Preferably, the flow restriction means comprise means for reducing the inner cross-sectional area of the fibre lumen in the region of the pot.

BRIEF DESCRIPTION OF THE DRAWINGS

Preferred embodiments of the invention will now be described, by way of example only, with reference to the accompanying drawings in which.

DETAILED DESCRIPTION OF THE PREFERRED EMBODIMENT

Figure 1:
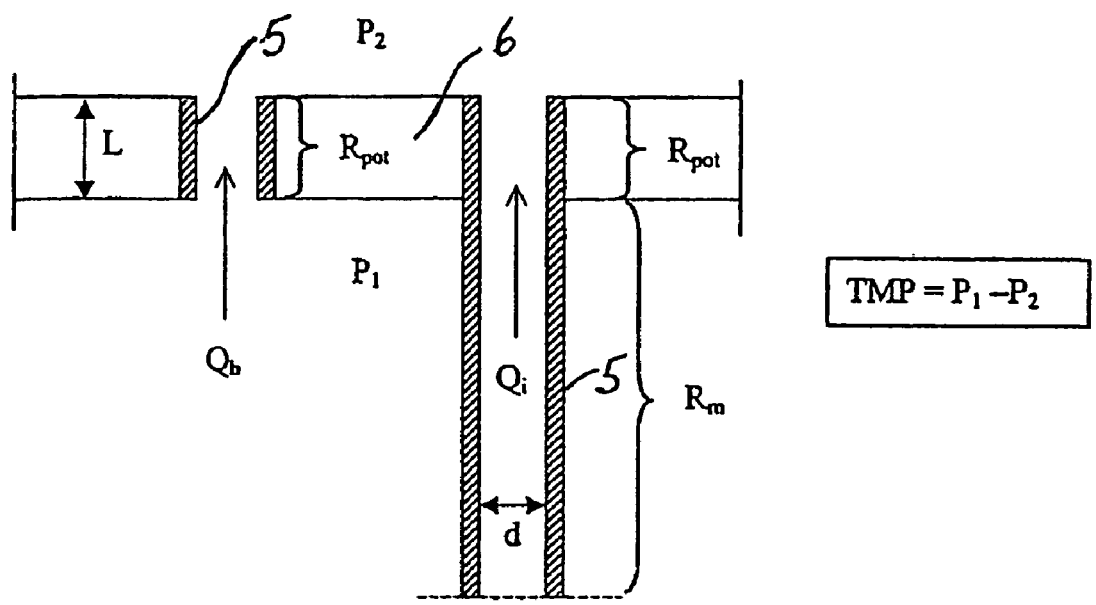
FIG. 1 is a schematic sectional elevation of a typical hollow fibre membrane module with an intact and broken fibre.
Figure 2:
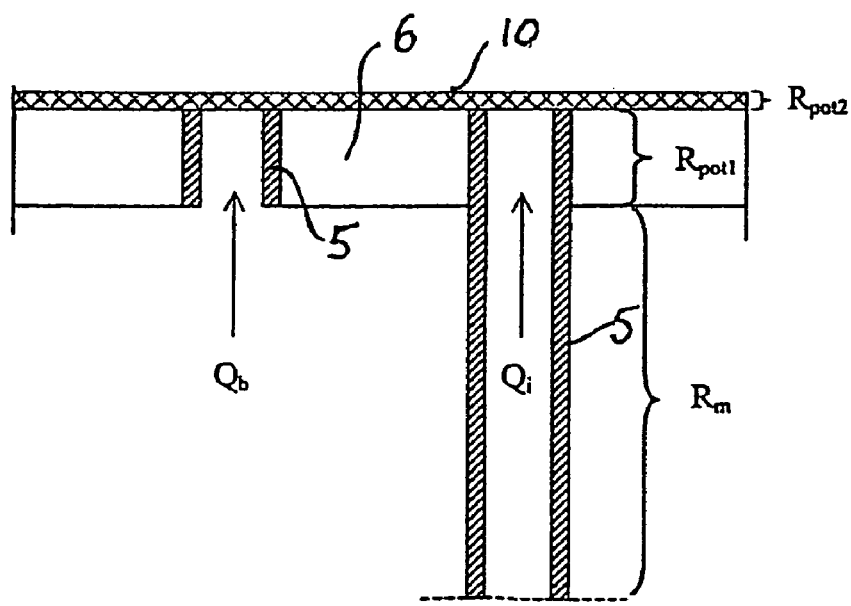
FIG. 2 is a similar view to FIG. 1 with the addition of a porous layer to the pot surface.

Referring to FIG. 2 of the drawings, one preferred embodiment of the invention is illustrated. A sinter or porous layer 10 is placed on top of the pot 6 to provide a further series resistance $R_{pot2}$ to the pot i.e.

$R_{pot}=R_{pot1}+R_{pot2}$

An appropriate sinter 10 may have openings of microns in dimension and only be a few millimeters thick. This method may reduce the $Q_b/Q_i$ by a factor of 10.

Such an arrangement provides added benefits when used for membrane filter systems in a bio-reactor. The high solids feed in bio reactors leads to the sludge actually plugging the filter and self sealing the broken fibre totally.

The may be extended to the general case by replacing the sinter with a membrane with the same pore size as the hollow fibre membrane and enabling achievement of this self plugging capability even with low solids feeds.

It will be apparent the extra resistance of the sinter or membrane 10 will require an extra pressure to maintain the module filtrate flow, however, this is only an operating cost not a membrane process operating efficiency as it is operating over the pot assembly, not across the compressible dirt layer on the membrane.

Fouling of this membrane sinter can be reduced by a regular chemical cleaning backwash with chlorine or other suitable cleaners.

The membrane/sinter 10 is desirably in intimate contact with the pot 6 to prevent sideways flow of filtrate/ feed bypass. This may also be achieved with a replaceable sinter/membrane element.

A highly asymmetric membrane 10 with the large pore side contacting the pot 6 (so in normal filtrate flow the filtrate flows in the direction of reducing pore size) is desirable.

As shown in FIGS. 3B-3K a variety of methods may be used to increase the pot flow resistance.

Figure 3:
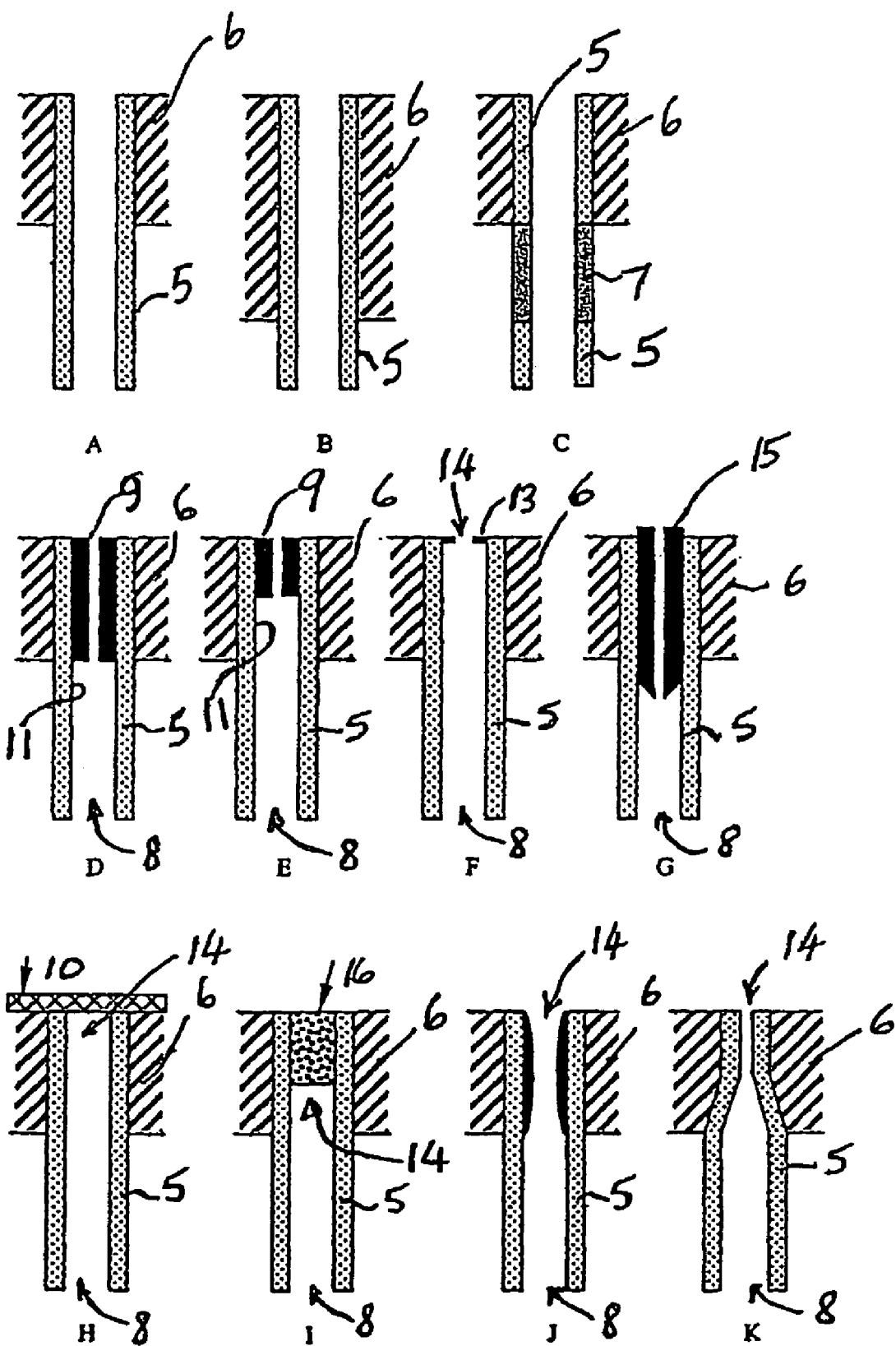
FIGS. 3A to 3K show enlarged schematic cross-sectional elevations of various embodiments of the invention.

Referring to FIG. 3A a normal pot 6 without modification is shown. FIG. 3B shows an increased length pot 6 which, while increasing pot flow resistance, has other disadvantages.

FIG. 3C illustrates providing the fibre 5 with a non porous coating 7 adjacent the interface 8 between the fibre 5 and the pot 6. This serves to increase pot flow resistance while also moving the fibre failure point away from the fibre-pot interface.

FIGS. 3D and 3E show a further method of reducing flow by reducing the inner diameter of the fibre lumen 8 using a layer of material 9 applied to part or whole of the inner surface 11 of the fibre lumen 8 in the region encompassed by the pot 6.

One method of providing such a layer 9 is to coat the inside of the lumen 8 near the end of the pot 6 with a thin layer of material that effectively reduces the diameter of the fibre lumen 8 at this point. This can be achieved by drawing up a material such as epoxy into the end of the fibre lumen 8 and then allowing it to run out again before it has time to set, leaving behind a thin coating 9 on the inner fibre lumen wall 12 that can then set over time.

The embodiment shown in FIG. 3F illustrates smearing the surface of the pot with a suitable grout material 13 to reduce the diameter of the fibre lumen 8 adjacent its opening 14 from the pot 6.

FIG. 3G shows the insertion of hollow annulus 15, for example, a hollow pin, into the end of the fibre lumen 8 in the region of the pot 6 to reduce the cross-sectional area of the lumen 8 in the region of the pot 6.

FIG. 3H shows the use of a porous layer of material 10 across the lumen opening 14 as also shown in the embodiment of FIG. 2.

FIG. 3I shows an embodiment where a porous material is forced into the lumen opening 14 to form a plug 16. This can be achieved by smearing a porous grout across and into the fibre lumen opening 14. Again this serves to reduce the flow resistance of the fibre lumen in the region of the pot 6.

FIG. 3J illustrates an embodiment of the invention where the fibre lumen 8 is narrowed within the region of the pot 6 by causing the potting material to swell or constricting the end of the fibre.

FIG. 3K shows an embodiment where the fibre lumen end is narrowed prior to potting.

Figure 4:
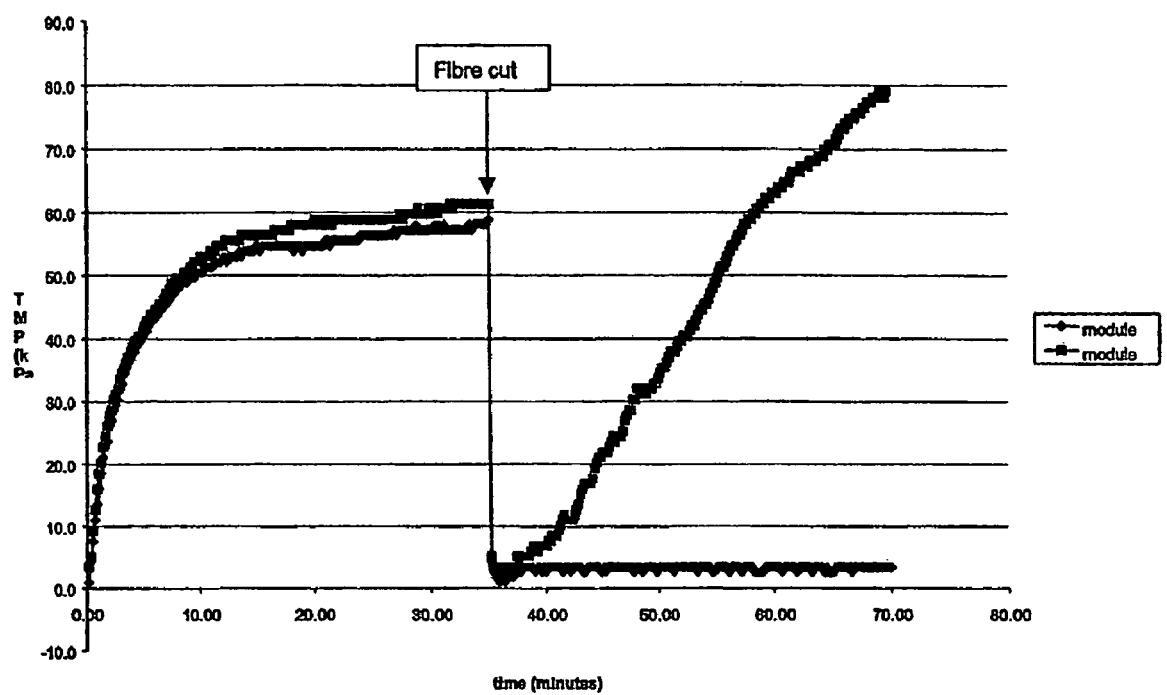
FIG. 4 shows the results of a test performed on two modules to illustrate the operation of the invention.

FIG. 4 shows the results of a test performed on two modules to illustrate the operation of the invention. Two modules A and B were used in the test. For each module one hollow fibre membrane was potted. The end of the fibre which was not in the pot, was sealed. A stainless steel mesh was glued on the top of one of the pots in a way that prevented sideways flow of feed bypass during filtration in a similar manner to the embodiments shown in FIGS. 2 and 3H. The mesh had openings of 51 microns and was 56 microns thick. The characteristics of both of the modules are shown in Table 1.

TABLE 1

Characteristics of the modules

| Name | Length of the pot $L_p$ (mm) | Length of the fibre $L_f$ (mm) | Other characteristics |
| --- | --- | --- | --- |
| Module A | 56 | 202 | none |
| Module B | 53 | 205 | Mesh glued on the pot |

Firstly, feed water was filtered through module A for 35 minutes. During this filtration, the transmembrane pressure (TMP) was measured. Then the fibre of module A was cut as close to the pot as possible and module A filtered the same feed water for a further 35 minutes. During this filtration, the transmembrane pressure (TMP) was measured. The same test was repeated with the module B using the same feed water.

The graph shown in FIG. 4 compares the TMP of the modules A and B during the two filtrations before and after the fibre was cut. The first part of the graph shows that the two curves are very similar. In particular, it shows that TMP of both modules increased at the same rate. Fibres of the modules were fouled at a similar rate. The small difference in TMP between the two modules is due to the mesh on module B which adds a small extra resistance to flow. The second part of the graph after the fibre of modules was cut shows that TMP of module A and B developed in a highly different way. The TMP of module A remained low and level whereas the TMP of module B increased sharply showing that the mesh was blocked by the feed contaminants.

This test clearly shows the efficiency of a mesh as far as reduction of integrity loss is concerned. Due to the addition of the mesh to the module, the cut fibre quickly sealed itself, preventing the feed from contaminating the filtrate.

It will be apparent to those skilled in the art that a wide variety and number of techniques can be used to reduce the flow within the fibre lumen in the region of the pot and that such techniques fall within the scope of the invention described. It will also be appreciated that further embodiments and exemplifications of the invention are possible without departing from the spirit or scope of the invention described.

What is claimed is:

1. A method of reducing an effect of an integrity loss in a hollow fibre membrane module, the module comprising a plurality of hollow fibre membranes, each hollow fibre membrane comprising a lumen, wherein at least one end of each of the hollow fibre membranes is supported in a pot forming at least one potted segment of the lumen and a remaining segment of the lumen, the method comprising:

increasing a flow resistance of a liquid through the at least one potted segment of the lumen, whereby an effect of an integrity loss is reduced, wherein increasing the flow resistance through the at least one potted segment of the lumen comprises plugging an end of the lumen with a porous material in a region of the pot.

* * * * *